(12) United States Patent
Zamorano et al.

(10) Patent No.: US 10,857,728 B2
(45) Date of Patent: Dec. 8, 2020

(54) COOLING OF PRINT DEVICE AND HEATING OF PRINT MATERIAL

(71) Applicant: HEWLETT-PACKARD DEVELOPMENT COMPANY, L.P., Houston, TX (US)

(72) Inventors: Juan Manuel Zamorano, Barcelona (ES); David Soriano Fosas, Terrassa (ES); Noel Liarte, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 169 days.

(21) Appl. No.: 16/063,084

(22) PCT Filed: Mar. 21, 2016

(86) PCT No.: PCT/EP2016/056829
§ 371 (c)(1),
(2) Date: Jun. 15, 2018

(87) PCT Pub. No.: WO2017/167356
PCT Pub. Date: Oct. 5, 2017

(65) Prior Publication Data
US 2019/0001559 A1    Jan. 3, 2019

(51) Int. Cl.
*B41J 29/377* (2006.01)
*F25B 21/04* (2006.01)
(Continued)

(52) U.S. Cl.
CPC ............ *B29C 64/20* (2017.08); *B29C 64/153* (2017.08); *B29C 64/264* (2017.08);
(Continued)

(58) Field of Classification Search
CPC ..... B29C 64/153; B29C 64/165; B29C 64/20; B29C 64/218; B29C 64/264; B29C 64/295; B29C 64/386; B29C 64/393; B33Y 10/00; B33Y 30/00; B33Y 99/00; B33Y 50/00; B33Y 50/02; B41J 29/377; F25B 21/04; F25B 30/00; F25B 2321/025; F25B 2321/0251; F28D 15/0266
USPC ..... 264/113, 308, 460, 497; 425/174.4, 375, 425/135, 143; 62/3.3, 113, 115, 119, 62/498, 513, 515; 165/58; 347/17, 18
See application file for complete search history.

(56) References Cited

U.S. PATENT DOCUMENTS

2003/0224081 A1    12/2003  Fong
2005/0220983 A1    10/2005  Hayes
(Continued)

FOREIGN PATENT DOCUMENTS

WO    WO2015190168 A1    12/2015

OTHER PUBLICATIONS

Ek, K.; "Additive Manufactured Material"; 2014; http://diva-portal.se/smash/get/diva2:768473/FULLTEXT01.pdf.

*Primary Examiner* — Leo B Tentoni
(74) *Attorney, Agent, or Firm* — HP Inc. Patent Department

(57) ABSTRACT

In an example, a print device comprises: a heat pump (102) to extract heat from a fluid source to produce cooled fluid and to transfer the heat from the fluid source to heat a print material (108), wherein the cooled fluid is used to cool a component (106) of the print device.

20 Claims, 4 Drawing Sheets

(51) Int. Cl.
*F25B 30/00* (2006.01)
*B29C 64/20* (2017.01)
*B33Y 40/00* (2020.01)
*B29C 64/295* (2017.01)
*B29C 64/264* (2017.01)
*F28D 15/02* (2006.01)
*B33Y 10/00* (2015.01)
*B33Y 30/00* (2015.01)
*B29C 64/153* (2017.01)
*B29C 35/04* (2006.01)

(52) U.S. Cl.
CPC ............ *B29C 64/295* (2017.08); *B33Y 10/00* (2014.12); *B33Y 30/00* (2014.12); *B33Y 40/00* (2014.12); *F28D 15/0266* (2013.01); *B29C 35/045* (2013.01); *F25B 2321/025* (2013.01); *F25B 2321/0251* (2013.01); *Y02B 30/52* (2013.01)

(56) References Cited

U.S. PATENT DOCUMENTS

| | | |
|---|---|---|
| 2008/0128956 A1* | 6/2008 | Perret .................. B29C 64/153 264/497 |
| 2010/0320649 A1 | 12/2010 | Niebling |
| 2011/0199447 A1 | 8/2011 | Takahashi et al. |
| 2012/0067510 A1 | 3/2012 | Knighton |
| 2012/0072006 A1 | 3/2012 | Knighton |
| 2012/0251688 A1 | 10/2012 | Zimmerman et al. |
| 2015/0190968 A1 | 7/2015 | Griszbacher |
| 2017/0056970 A1* | 3/2017 | Chin ...................... B33Y 30/00 |

\* cited by examiner

COOLING OF PRINT DEVICE AND HEATING OF PRINT MATERIAL

BACKGROUND

Three-dimensional objects generated by an additive manufacturing process may be formed in a layer-by-layer manner. In one example of additive manufacturing, an object is generated by solidifying portions of layers of build material. In examples, the build material may be in the form of a powder, liquid or sheet material.

In some such processes, energy is applied to a build material. For example, energy may be applied to preheat the build material to a temperature which is close to its melting point. Energy may also be applied to cause melting, so that regions of the build material may fuse to form an object.

BRIEF DESCRIPTION OF DRAWINGS

Examples will now be described, by way of non-limiting example, with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material. For example, a coalescing agent (also termed a 'fusing agent') may be selectively distributed onto portions of a layer of build material in a pattern derived from data representing a slice of a three-dimensional object to be generated (which may for example be generated from structural design data). The coalescing agent may have a composition such that, when energy (for example, heat) is applied to the layer, the build material coalesces and solidifies to form a slice of the three-dimensional object in accordance with the pattern. In other examples, coalescence may be achieved in some other manner.

Examples of apparatus for additive manufacturing which utilise 'inkjet' techniques to disperse such agents have been proposed. Such apparatus may comprise a print agent distributor for example in the form of a print head. An example print agent distributor comprises a set of nozzles and a mechanism for ejecting a selected agent as a fluid, for example a liquid, through the nozzles.

Where an energy source is used to create fusion, in some examples, the build material is preheated. This may for example reduce the energy consumed in causing fusion, or may reduce unwanted effects such as shrinkage or deformation of a generated object.

Figure 1:
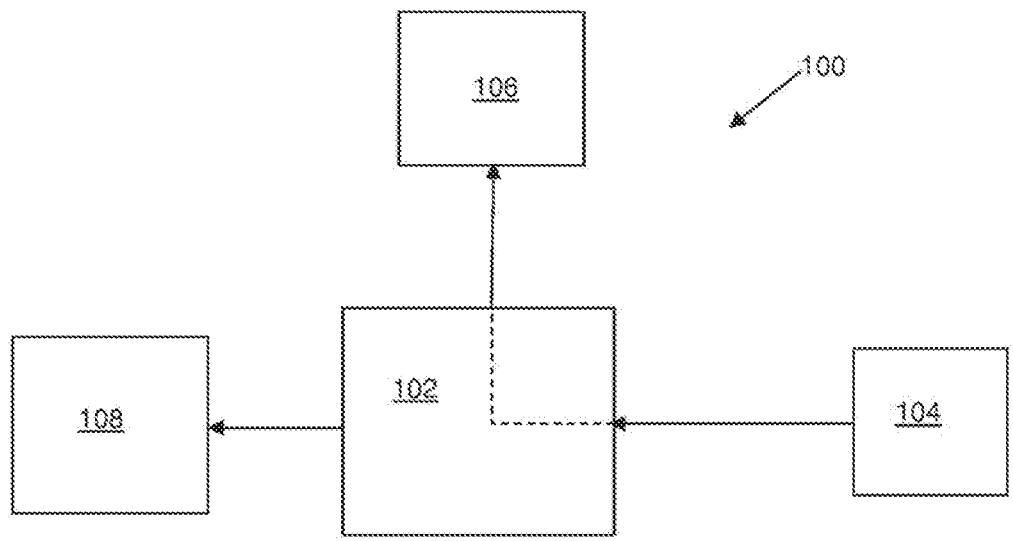
FIG. 1 is a simplified schematic of an example of a print device.

FIG. 1 is a schematic view of a device 100 which incorporates a temperature regulating apparatus.

The temperature regulating apparatus comprises a heat pump 102 which is in thermal contact (either directly or indirectly) with an air source 104. The heat pump 102 extracts heat from the air to produce cooled air. The cooled air is then used to cool a component 106, such as an electrical component, of the print device 100 by passing the cooled air over the component 106, for example. The heat pump 102 transfers the heat from the air source to a print material 108 so as to heat the print material 108.

Figure 2:
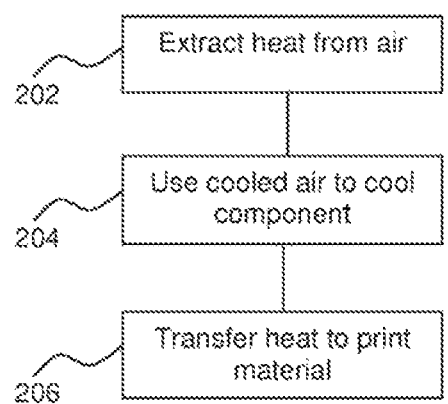
FIG. 2 is a flowchart of an example of a method for use in printing.

FIG. 2 is a flow chart of an example of a method which may be used in printing, for example with the print device 100 of FIG. 1.

In block 202, heat is extracted from an air source using a heat pump in order to produce cooled air. In block 204, the cooled air is then used to cool a component of a print device. For example, the cooled air may be passed over, around or through the component. Further, in block 206, the heat from the air source is transferred to a print material using the heat pump in order to heat the print material.

In some examples, the device may be a latex-ink based printer. The heat pump 102 may be used to heat latex ink, to cure or to help cure the ink. The cooled air may be used, for example, to cool a printhead (pen) or other component of the printer.

In other examples, the device may be an additive manufacturing apparatus, an example of which will be described with reference to FIG. 3.

Figure 3:
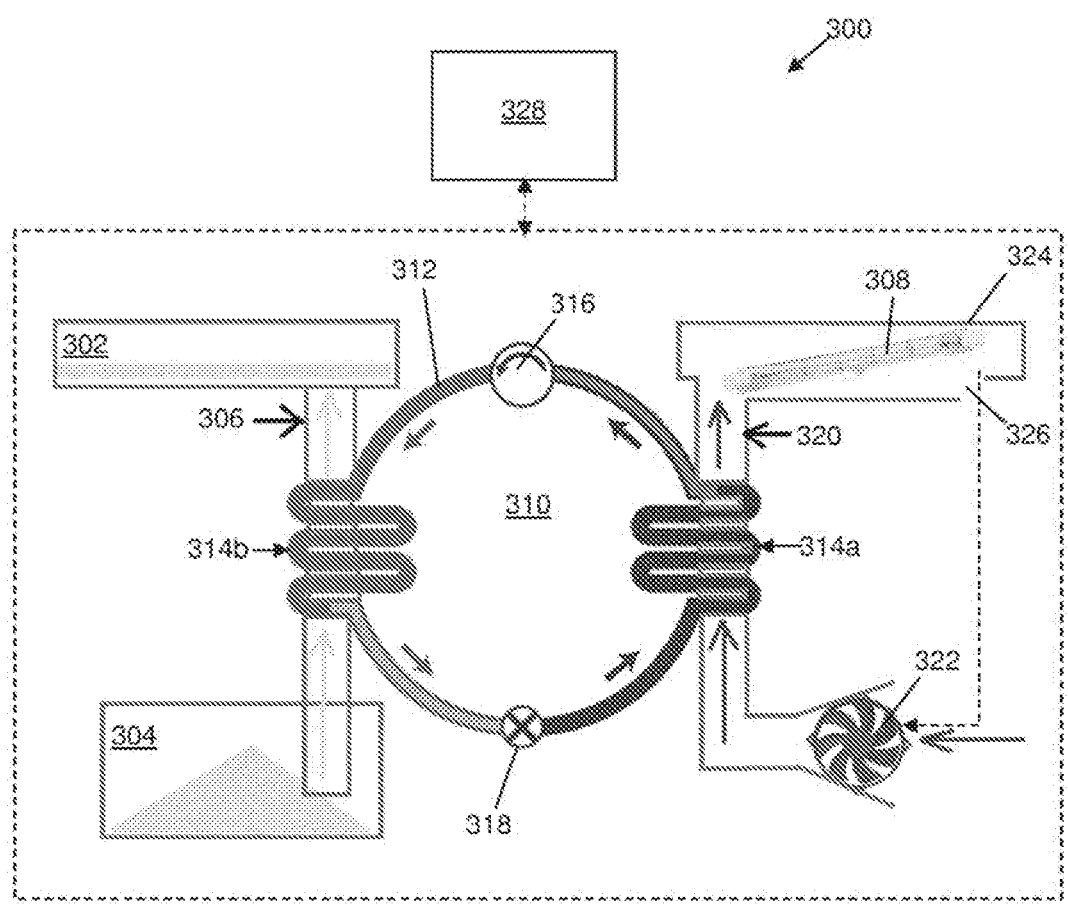
FIG. 3 is a simplified schematic of an example of an additive manufacturing apparatus.

FIG. 3 is a schematic view of an example additive manufacturing apparatus 300 which incorporates a temperature regulating apparatus.

The additive manufacturing apparatus 300 comprises a print bed 302. The print bed 302 is connected to container 304 via a feeder 306. The container 304 contains a granular build material (e.g. powder) which is supplied to the print bed 302 by the feeder 306. Specifically, the feeder 306 delivers the powder from the container 304 to a powder distribution area, and the powder is spread from the distribution area over the print bed to form a layer of powder on the print bed.

The feeder 306 may be in the form of a screw conveyor (i.e. an Archimedes screw) having an auger with a helical flight which is rotatably mounted within a hollow cylindrical tube. The container 304 is located below the print bed 302 and the rotation of the auger draws the build material upwards along the tube towards the print bed 302 where it is deposited.

The build material may be distributed across the print bed 302 using a roller or the like.

The additive manufacturing apparatus 300 further comprises an energy source 308, such as a lamp. The energy source 308 is used to fuse the build material on which a fusing agent has been applied.

An example of a temperature regulating apparatus of the additive manufacturing apparatus will now be described. The temperature regulating apparatus comprises a heat pump 310. The heat pump 310 comprises a refrigerant circuit 312 in which a refrigerant fluid is provided. The refrigerant circuit 312 comprises a source heat exchanger 314a and a sink heat exchanger 314b. The refrigerant circuit 312 further comprises a compressor 316 which is disposed between the source and sink heat exchangers 314a, 314b on a first side of the refrigerant circuit 312 and an expansion valve 318 which is disposed between the source and sink heat exchangers 314a, 314b on a second side of the refrigerant circuit 312, opposite to the compressor 316.

The temperature regulating apparatus further comprises an intake duct 320. The intake duct 320 is provided with an intake fan 322 which draws ambient air into the intake duct 320. A portion of the intake duct 320 is in thermal contact (either directly or indirectly) with the source heat exchanger 314a.

On entering the source heat exchanger 314a, the refrigerant is at a relatively low pressure and temperature and is in the liquid phase. The refrigerant extracts heat from the ambient air causing the refrigerant to evaporate into gas. The source heat exchanger 314a may therefore also be referred to as an evaporator. The extraction of heat from the ambient air thus reduces the temperature of the air.

The cooled air is fed by the intake duct 320 to the energy source 308 where it is used to cool the energy source 308 as the energy source 308 is used to preheat the build material.

The energy source 308 may be housed within a container 324 and the intake duct 320 may supply the cooled air into the container in order to improve thermal transfer. As shown, the container 324 comprises an exhaust port 326 from which the air is released after it has absorbed heat from the energy source.

The air which has been warmed by the energy source 308 may be recycled to the intake duct 320 by connecting the exhaust port 326 to the intake duct 320 in order to form a closed loop (as depicted by the dashed arrow).

On exiting the source heat exchanger 314a, the gaseous refrigerant enters the compressor 316. The compressor 316 compresses the gaseous refrigerant which increases its pressure and temperature. The high pressure, high temperature gaseous refrigerant subsequently enters the sink heat exchanger 314b. The sink heat exchanger 314b is in thermal contact (either directly or indirectly) with the feeder 306. For example, the sink heat exchanger 314b may be in contact with or be integrally formed with the hollow cylindrical tube and/or the helical flight. Consequently, heat from the refrigerant is transferred to the build material being supplied to the print bed 302. Accordingly, the build material is supplied to the print bed 302 at an elevated temperature and is therefore preheated prior to fusion. This may for example reduce the energy consumed in causing fusion, and/or may reduce unwanted effects such as shrinkage or deformation of a generated object. The extraction of heat from the refrigerant causes the refrigerant to condense into liquid. The sink heat exchanger 314b may therefore also be referred to as a condenser.

The heat pump 310 is therefore able to regulate the temperature of the energy source 308 and the build material. The temperature regulating apparatus further comprises a controller 328 which controls operation of the heat pump 310 so as to regulate the temperature of the energy source 308 and the build material. For example, the controller 328 can control the temperature of the refrigerant in the source and sink heat exchangers 314a, 314b by regulating the operation of the compressor 316 and also the flow rate of air through the intake duct 320 using the intake fan 322. The controller 328 is thus able to accommodate incoming ambient air at different temperatures and still provide an appropriate amount of cooling of the energy source 308 and heating of the build material.

The controller 328 may be provided with a user interface which allows a user to input a setpoint temperature for the build material and/or energy source 308. The controller 328 may then control the parameters of the heat pump 310 in order to achieve and maintain the setpoint temperature(s). The controller 328 may comprise a PID (proportional-integral-derivative) controller or the like. The controller 328 may instead include factory-set temperatures, such that a user interface is not needed.

The heat pump 310 may be sized so as to ensure the proper operating temperatures of the energy source 308 and build material can be maintained over the normal working conditions of the additive manufacturing apparatus. However, an auxiliary heat source and/or sink may be provided which can be activated by the controller 328 when it is not possible to achieve the set temperatures. The auxiliary heat source or sink may act directly on the build material and the energy source 308 or may instead act on the ambient air or refrigerant.

Although not shown, where the energy source 308 is at the setpoint temperature, the controller 18 may redirect the cooled air to other systems (for example, to a carriage cooling system) or simply exhaust the cooled air to the surrounding atmosphere. Similarly, where the build material is at the optimal temperature, the excess heat may be wasted.

Although it has been described that the cooled air is used to cool the energy source 308, it will be appreciated that the cooled air may be used to cool other elements of the additive manufacturing apparatus 300, in particular other electrical components.

Further, air may be drawn into the intake duct 320 passively instead of using the intake fan 322.

Further, the sink heat exchanger 314b may transfer heat to the build material after it has been deposited on the print bed 302 rather than during its passage through the feeder 306.

The controller 328 may be implemented as two separate controllers which are dedicated to heating and cooling respectively.

Any form of build material feeder may be used and the feeder 306 is not limited to the screw conveyor (Archimedes screw) described previously.

Figure 4:
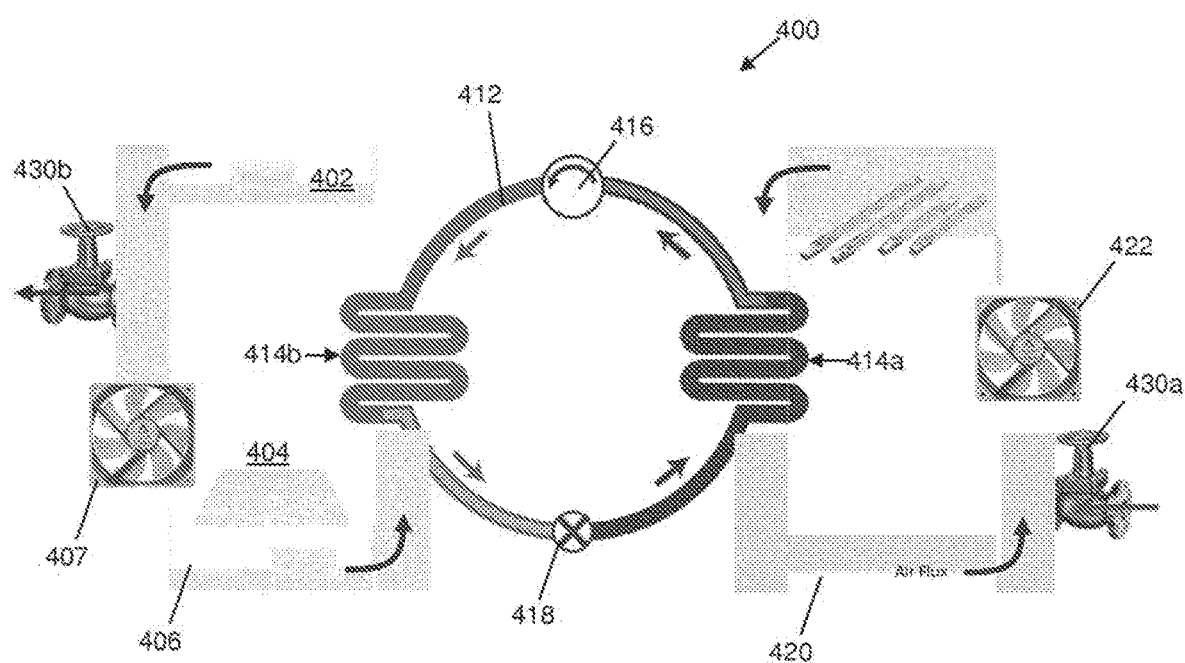
FIG. 4 is a simplified schematic of another example of an additive manufacturing apparatus.

FIG. 4 is a schematic view of another additive manufacturing apparatus 300 which incorporates a temperature regulating apparatus.

As per the additive manufacturing apparatus 300, the additive manufacturing apparatus 400 comprises a print bed 402 which receives a granular build material (e.g. powder) from a container 404 in a layer-by-layer manner.

The additive manufacturing apparatus 400 comprises a heating circuit 406 which passes through the container 404 and past a sink heat exchanger 414b of a heat pump 410. The heating circuit 406 comprises a fan 407 which circulates air around the heating circuit 406.

The additive manufacturing apparatus 400 further comprises an energy source 408, such as a lamp, which is used to selectively fuse the build material.

The energy source 408 is provided in the path of a cooling circuit 420. The cooling circuit 420 passes past a source heat exchanger 414a of the heat pump 410.

The cooling circuit 420 comprises a fan 422 which circulates air around the cooling circuit 420.

In the cooling circuit 420, the energy source 408 is immediately upstream of the source heat exchanger 414a. The air flowing around the cooling circuit 420 thus absorbs heat from the energy source 408, thereby reducing the temperature of the energy source 408. The heat is then transferred to refrigerant within a refrigerant circuit 412 of the heat pump 410 via the source heat exchanger 414a. Consequently, the air is cooled before it is recirculated to the energy source 408. The air is therefore able to again extract heat from the energy source 408.

The heat from the energy source 408 extracted by the cooling circuit 420 is transferred to the sink heat exchanger 418b of the heat pump 410. Here the heat is extracted by the heating circuit 406. The air circulating within the heating circuit 406 passes through the container 404 such that build material is entrained within the air flow. The container 404 is immediately downstream of the sink heat exchanger 414b. The air with the entrained build material flows past the sink heat exchanger 414b such that the heat is absorbed by the air flow thereby heating the build material. The preheated build material is subsequently deposited on the print bed 402 prior to fusion of the build material using the energy source 408. After depositing the build material at the print bed 404, the air is recirculated back to the container 404 where it is used to transport new build material to the print bed 404.

It will be appreciated that the heat generated by the energy source 406 is transferred by the heat pump 410 via the cooling and heating circuits 420, 406 to the build material in order to provide a preheating function.

The cooling circuit 420 may be provided with a valve 430a which allows cooled air to be released from the cooling circuit 420 and replaced by ambient air to regulate the temperature of the air flow around the cooling circuit 420. Similarly, the heating circuit 406 may be provided with a valve 430b which allows heated air to be released from the heating circuit 406 and replaced by ambient air in order to control excess heat.

As per the additive manufacturing apparatus 300, the additive manufacturing apparatus 400 may also be provided with a controller which regulates the operation of the heat pump 410 and, where provided, the valves 430a, 430b in order to provide an appropriate amount of cooling of the energy source 408 and heating of the build material.

Although the apparatuses have been described as using an air source, it will be appreciated that other gases and liquids (i.e. fluids) may be used.

For example, the heating circuit 406 and/or the cooling circuit 420 of the apparatus 400 may use a liquid, such as oil or water. It will be appreciated that the build material would need to be isolated from the liquid and so the liquid-based heating circuit may be provided in addition to a gas-based (e.g. air-based) heating circuit which may transport the build material to the print bed 402.

In examples, such apparatus may contain further components not described in detail herein. For example, the apparatus may comprise a print head for applying a print agent, which may be mounted on a carriage or the like, and may in some examples make use of inkjet technology. The apparatus may further comprise a means for directing energy emitted from the energy source, and/or a means for focusing or defocusing energy emitted thereby. Build material and/or print agent hoppers, build material spreading apparatus, user interfaces, additional control functions to control aspects of the additive manufacturing apparatus, etc. may also be provided in examples.

The concepts described herein are not limited to additive manufacturing and may be implemented While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A print device comprising:
a fluid source comprising an intake for drawing ambient air;
a heat pump to extract heat from the ambient air to produce a cooled fluid and to transfer the heat to heat a print material,
the heat pump further to transfer the cooled fluid comprising cooled ambient air to cool a component of the print device.

2. A print device according to claim 1, wherein the heat pump comprises a source heat exchanger and a sink heat exchanger, wherein the source heat exchanger is in thermal contact with the fluid source and wherein the sink heat exchanger is in thermal contact with the print material.

3. A print device according to claim 2, wherein the print device is an additive manufacturing apparatus and wherein the print material is a build material and the component cooled by the cooled fluid is an energy source to fuse the build material.

4. A print device according to claim 3, further comprising a print bed to receive the build material in a layer-wise manner and a feeder to supply the build material from a container to the print bed.

5. A print device according to claim 4, wherein the sink heat exchanger is in thermal contact with the feeder to heat the build material as it is conveyed to the print bed.

6. A print device according to claim 2, wherein the intake further comprises an intake duct and a fan to draw the fluid through the intake duct past the source heat exchanger.

7. A print device according to claim 6, wherein the component cooled by the cooled fluid is housed within a container and the intake duct is fluidically coupled to the container to supply the cooled fluid into the container.

8. A print device according to claim 7, wherein the container comprises an exhaust port.

9. A print device according to claim 8, wherein the exhaust port is connected to the intake duct so as to recycle the fluid to the intake duct.

10. A print device according to claim 1, further comprising a controller to control the operation of the heat pump and to thereby regulate the temperature of the component cooled by the cooled fluid and/or the temperature of the print material.

11. A print device according to claim 10, wherein the controller redirects the cooled fluid or the heat from the ambient air to another component or waste when the component or print material has reached a set temperature.

12. A print device according to claim 2, further comprising a cooling circuit in which fluid of the fluid source circulates past the component and the source heat exchanger; wherein the cooling circuit is arranged such that the fluid is heated by the component prior to the heat being extracted by the source heat exchanger such that the heat is transferred from the component to the print material.

13. A print device according to claim 2, further comprising a heating circuit in which fluid circulates past the print material and the sink heat exchanger; wherein the fluid carries the print material past the sink heat exchanger such that the print material absorbs heat from the sink heat exchanger.

14. A temperature regulating apparatus for an additive manufacturing apparatus, the temperature regulating apparatus comprising:
 a heat pump to extract heat from a fluid from a fluid source to produce cooled fluid and to transfer the heat from the fluid source to pre-heat a build material prior to the build material being formed into a specified object by the additive manufacturing apparatus,
 wherein the head pump is further to direct the cooled fluid to cool a component of the additive manufacturing apparatus.

15. A method of regulating temperatures inside a print device, the method comprising:
 drawing ambient air into the print device through an intake;
 extracting heat from the ambient air drawn into the print device using a heat pump in order to produce cooled air;
 using the cooled air to cool a component of a print device; and
 transferring the heat extracted from the ambient air to a print material using the heat pump in order to heat the print material.

16. The temperature regulating apparatus of claim 14, wherein the heat pump comprises a sink heat exchanger that is in thermal contact with a feeder that transports the build material to a print bed where the specified object is formed, the sink heat exchanger to pre-heat the build material as the build material is conveyed by the feeder to the print bed.

17. The temperature regulating apparatus of claim 14, wherein the fluid source comprises an intake for ambient air.

18. The temperature regulating apparatus of claim 14, wherein the component cooled by the cooled fluid comprises an energy source arranged to fuse the build material when forming the specified object.

19. The temperature regulating apparatus of claim 18, wherein, when the energy source is cooled to a setpoint temperature, the temperature regulating apparatus redirects the cooled fluid to a different component for cooling or exhausts the cooled fluid to the ambient atmosphere.

20. A print device according to claim 1, wherein the heat pump comprises:
 a cooling circuit having a first valve to allow cooled air to be released from the cooling circuit and be replaced by ambient air; and
 a heating circuit comprising a second valve to allow heated air to be released from the heating circuit and be replaced by ambient air.

* * * * *